(12) United States Patent
Kish

(10) Patent No.: US 8,792,414 B2
(45) Date of Patent: Jul. 29, 2014

(54) COVERAGE ENHANCEMENT USING DYNAMIC ANTENNAS

(75) Inventor: William Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 2589 days.

(21) Appl. No.: 11/413,293

(22) Filed: Apr. 28, 2006

(65) Prior Publication Data

US 2007/0026807 A1    Feb. 1, 2007

Related U.S. Application Data

(60) Provisional application No. 60/702,730, filed on Jul. 26, 2005.

(51) Int. Cl.
| | |
|---|---|
| *H04W 4/00* | (2009.01) |
| *H04B 7/04* | (2006.01) |
| *H04W 88/08* | (2009.01) |
| *H04W 4/06* | (2009.01) |
| *H04W 84/12* | (2009.01) |

(52) U.S. Cl.
CPC ............ *H04B 7/0408* (2013.01); *H04W 88/08* (2013.01); *H04W 4/06* (2013.01); *H04W 84/12* (2013.01)
USPC .......................................... 370/328; 370/338

(58) Field of Classification Search
USPC .......................................... 370/338, 339, 328
See application file for complete search history.

(56) References Cited

U.S. PATENT DOCUMENTS

| | | | |
|---|---|---|---|
| 4,027,307 | A | 5/1977 | Litchford |
| 4,176,356 | A | 11/1979 | Foster et al. |
| 4,193,077 | A | 3/1980 | Greenberg et al. |
| 4,253,193 | A | 2/1981 | Kennard |
| 4,305,052 | A | 12/1981 | Baril et al. |

(Continued)

FOREIGN PATENT DOCUMENTS

| | | |
|---|---|---|
| EP | 0352787 | 7/1989 |
| EP | 0 534 612 | 3/1993 |

(Continued)

OTHER PUBLICATIONS

Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.

(Continued)

*Primary Examiner* — George Eng
*Assistant Examiner* — Nam Huynh
(74) *Attorney, Agent, or Firm* — Lewis Roca Rothgerber LLP

(57) ABSTRACT

Mechanisms for wireless local area network coverage enhancement using dynamic antennas are provided. The dynamic antennas may be used, for example, in an antenna apparatus of an access point. The access point maps a plurality of virtual access points (VAPs), each VAP corresponding to at least one of a plurality of directional antenna patterns of the antenna apparatus. The processor transmits broadcast communication on each of the VAPs a further distance from the access point as compared to transmitting on an omnidirectional antenna pattern of the antenna apparatus.

13 Claims, 6 Drawing Sheets

(56) References Cited

U.S. PATENT DOCUMENTS

| | | | |
|---|---|---|---|
| 4,513,412 A | 4/1985 | Cox | |
| 4,641,304 A | 2/1987 | Raychaudhuri | |
| 4,814,777 A | 3/1989 | Monser | |
| 5,097,484 A | 3/1992 | Akaiwa | |
| 5,173,711 A | 12/1992 | Takeuchi et al. | |
| 5,203,010 A | 4/1993 | Felix | |
| 5,220,340 A | 6/1993 | Shafai | |
| 5,373,548 A | 12/1994 | McCarthy | |
| 5,408,465 A | 4/1995 | Gusella et al. | |
| 5,453,752 A | 9/1995 | Wang et al. | |
| 5,507,035 A | 4/1996 | Bantz | |
| 5,559,800 A | 9/1996 | Mousseau et al. | |
| 5,697,066 A | 12/1997 | Acampora | |
| 5,754,145 A | 5/1998 | Evans | |
| 5,767,809 A | 6/1998 | Chuang et al. | |
| 5,802,312 A | 9/1998 | Lazaridis et al. | |
| 5,940,771 A | 8/1999 | Gollnick et al. | |
| 5,964,830 A | 10/1999 | Durrett | |
| 6,005,525 A | 12/1999 | Kivela | |
| 6,034,638 A | 3/2000 | Thiel et al. | |
| 6,094,177 A | 7/2000 | Yamamoto | |
| 6,169,888 B1 | 1/2001 | Lindenmeier et al. | |
| 6,249,216 B1 | 6/2001 | Flick | |
| 6,266,528 B1 | 7/2001 | Farzaneh | |
| 6,266,537 B1 | 7/2001 | Kashitani et al. | |
| 6,288,682 B1 | 9/2001 | Thiel et al. | |
| 6,292,153 B1 | 9/2001 | Aiello et al. | |
| 6,307,524 B1 | 10/2001 | Britain | |
| 6,317,599 B1 | 11/2001 | Rappaport et al. | |
| 6,326,922 B1 | 12/2001 | Hegendoerfer | |
| 6,337,628 B2 | 1/2002 | Campana, Jr. | |
| 6,337,668 B1 | 1/2002 | Ito et al. | |
| 6,339,404 B1 | 1/2002 | Johnson et al. | |
| 6,345,043 B1 | 2/2002 | Hsu | |
| 6,356,242 B1 | 3/2002 | Ploussios | |
| 6,356,243 B1 | 3/2002 | Schneider et al. | |
| 6,356,905 B1 | 3/2002 | Gershman et al. | |
| 6,377,227 B1 | 4/2002 | Zhu et al. | |
| 6,392,610 B1 | 5/2002 | Braun et al. | |
| 6,404,386 B1 | 6/2002 | Proctor, Jr. et al. | |
| 6,407,719 B1 | 6/2002 | Ohira et al. | |
| 6,442,507 B1 | 8/2002 | Skidmore et al. | |
| 6,445,688 B1 | 9/2002 | Garces et al. | |
| 6,492,957 B2 | 12/2002 | Carillo, Jr. et al. | |
| 6,493,679 B1 | 12/2002 | Rappaport et al. | |
| 6,496,504 B1 | 12/2002 | Malik | |
| 6,498,589 B1 | 12/2002 | Horii | |
| 6,499,006 B1 | 12/2002 | Rappaport et al. | |
| 6,507,321 B2 | 1/2003 | Oberschmidt et al. | |
| 6,606,059 B1 | 8/2003 | Barabash | |
| 6,625,454 B1 | 9/2003 | Rappaport et al. | |
| 6,674,459 B2 | 1/2004 | Ben-Shachar et al. | |
| 6,701,522 B1 | 3/2004 | Rubin et al. | |
| 6,725,281 B1 | 4/2004 | Zintel et al. | |
| 6,753,814 B2 | 6/2004 | Killen et al. | |
| 6,762,723 B2 | 7/2004 | Nallo et al. | |
| 6,779,004 B1 | 8/2004 | Zintel | |
| 6,819,287 B2 | 11/2004 | Sullivan et al. | |
| 6,876,280 B2 | 4/2005 | Nakano | |
| 6,888,504 B2 | 5/2005 | Chiang et al. | |
| 6,888,893 B2 | 5/2005 | Li et al. | |
| 6,892,230 B1 | 5/2005 | Gu et al. | |
| 6,906,678 B2 | 6/2005 | Chen | |
| 6,910,068 B2 | 6/2005 | Zintel et al. | |
| 6,924,768 B2 | 8/2005 | Wu et al. | |
| 6,931,429 B2 | 8/2005 | Gouge et al. | |
| 6,941,143 B2 | 9/2005 | Mathur | |
| 6,950,019 B2 | 9/2005 | Bellone et al. | |
| 6,961,028 B2 | 11/2005 | Joy et al. | |
| 6,961,573 B1 | 11/2005 | Moon et al. | |
| 6,973,622 B1 | 12/2005 | Rappaport et al. | |
| 6,975,834 B1 | 12/2005 | Forster | |
| 7,034,770 B2 | 4/2006 | Yang et al. | |
| 7,043,277 B1 | 5/2006 | Pfister | |
| 7,050,809 B2 | 5/2006 | Lim | |
| 7,064,717 B2 | 6/2006 | Kaluzni et al. | |
| 7,085,814 B1 | 8/2006 | Gandhi et al. | |
| 7,089,307 B2 | 8/2006 | Zintel et al. | |
| 7,130,895 B2 | 10/2006 | Zintel et al. | |
| 7,164,380 B2 | 1/2007 | Saito | |
| 7,171,475 B2 | 1/2007 | Weisman et al. | |
| 7,190,972 B1* | 3/2007 | Hollister et al. | 455/556.1 |
| 7,206,610 B2* | 4/2007 | Iacono et al. | 455/562.1 |
| 7,254,373 B2 | 8/2007 | Paljug et al. | |
| 7,333,460 B2* | 2/2008 | Vaisanen et al. | 370/338 |
| 7,355,998 B2* | 4/2008 | Briancon et al. | 370/328 |
| 7,385,962 B1 | 6/2008 | Valo | |
| 7,596,388 B2 | 9/2009 | Willins et al. | |
| 7,609,648 B2 | 10/2009 | Hoffmann et al. | |
| 7,649,831 B2 | 1/2010 | Van Rensburg et al. | |
| 7,724,658 B1 | 5/2010 | Eiriksson et al. | |
| 7,773,557 B2 | 8/2010 | Grant et al. | |
| 7,782,895 B2 | 8/2010 | Pasanen et al. | |
| 7,835,697 B2 | 11/2010 | Wright | |
| 7,877,113 B2 | 1/2011 | Kish et al. | |
| 7,899,497 B2 | 3/2011 | Kish et al. | |
| 7,933,628 B2 | 4/2011 | Kish et al. | |
| 8,150,470 B2 | 4/2012 | Kish et al. | |
| 8,217,843 B2 | 7/2012 | Shtrom et al. | |
| 8,594,734 B2 | 11/2013 | Kish et al. | |
| 2001/0012764 A1 | 8/2001 | Edwards et al. | |
| 2002/0031130 A1 | 3/2002 | Tsuchiya et al. | |
| 2002/0047800 A1 | 4/2002 | Proctor, Jr. et al. | |
| 2002/0080767 A1 | 6/2002 | Lee | |
| 2002/0084942 A1 | 7/2002 | Tsai et al. | |
| 2002/0105471 A1 | 8/2002 | Kojima et al. | |
| 2002/0112058 A1 | 8/2002 | Weisman et al. | |
| 2002/0119757 A1 | 8/2002 | Hamabe | |
| 2002/0142744 A1 | 10/2002 | Okanoue et al. | |
| 2002/0158798 A1 | 10/2002 | Chiang et al. | |
| 2002/0158801 A1 | 10/2002 | Crilly, Jr. et al. | |
| 2002/0170064 A1 | 11/2002 | Monroe et al. | |
| 2003/0026240 A1 | 2/2003 | Eyuboglu et al. | |
| 2003/0030588 A1 | 2/2003 | Kalis et al. | |
| 2003/0038698 A1 | 2/2003 | Hirayama | |
| 2003/0063591 A1 | 4/2003 | Leung et al. | |
| 2003/0122714 A1 | 7/2003 | Wannagot et al. | |
| 2003/0162551 A1* | 8/2003 | Atarashi et al. | 455/456 |
| 2003/0169330 A1 | 9/2003 | Ben-Shachar et al. | |
| 2003/0172114 A1 | 9/2003 | Leung | |
| 2003/0184490 A1 | 10/2003 | Raiman et al. | |
| 2003/0189514 A1 | 10/2003 | Miyano et al. | |
| 2003/0189521 A1 | 10/2003 | Yamamoto et al. | |
| 2003/0189523 A1 | 10/2003 | Ojantakanen et al. | |
| 2003/0210207 A1 | 11/2003 | Suh et al. | |
| 2003/0227414 A1 | 12/2003 | Saliga et al. | |
| 2003/0227880 A1 | 12/2003 | Heller et al. | |
| 2003/0228857 A1 | 12/2003 | Maeki | |
| 2004/0008614 A1 | 1/2004 | Matsuoka et al. | |
| 2004/0014432 A1 | 1/2004 | Boyle | |
| 2004/0017310 A1 | 1/2004 | Runkle et al. | |
| 2004/0017860 A1 | 1/2004 | Liu | |
| 2004/0027291 A1 | 2/2004 | Zhang et al. | |
| 2004/0027304 A1 | 2/2004 | Chiang et al. | |
| 2004/0032378 A1 | 2/2004 | Volman et al. | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0047296 A1 | 3/2004 | Tzannes et al. | |
| 2004/0048593 A1 | 3/2004 | Sano | |
| 2004/0058690 A1 | 3/2004 | Ratzel et al. | |
| 2004/0061653 A1 | 4/2004 | Webb et al. | |
| 2004/0070543 A1 | 4/2004 | Masaki | |
| 2004/0080455 A1 | 4/2004 | Lee | |
| 2004/0082356 A1 | 4/2004 | Walton et al. | |
| 2004/0095278 A1 | 5/2004 | Kanemoto et al. | |
| 2004/0114535 A1 | 6/2004 | Hoffmann et al. | |
| 2004/0125777 A1 | 7/2004 | Doyle et al. | |
| 2004/0132496 A1 | 7/2004 | Kim et al. | |
| 2004/0162115 A1 | 8/2004 | Smith et al. | |
| 2004/0165563 A1 | 8/2004 | Hsu et al. | |
| 2004/0190477 A1 | 9/2004 | Olson et al. | |
| 2004/0260800 A1 | 12/2004 | Gu et al. | |
| 2005/0022210 A1 | 1/2005 | Zintel et al. | |

(56) References Cited

U.S. PATENT DOCUMENTS

| | | |
|---|---|---|
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0053164 A1 | 3/2005 | Catreux |
| 2005/0074018 A1 | 4/2005 | Zintel et al. |
| 2005/0083852 A1 | 4/2005 | Alastalo et al. |
| 2005/0097503 A1 | 5/2005 | Zintel et al. |
| 2005/0128988 A1* | 6/2005 | Simpson et al. .............. 370/338 |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0148306 A1 | 7/2005 | Hiddink |
| 2005/0153658 A1 | 7/2005 | Nagy |
| 2005/0180381 A1 | 8/2005 | Retzer et al. |
| 2005/0185707 A1 | 8/2005 | Hoo et al. |
| 2005/0188193 A1 | 8/2005 | Kuehnel et al. |
| 2005/0240665 A1 | 10/2005 | Gu et al. |
| 2005/0250544 A1 | 11/2005 | Grant et al. |
| 2005/0255892 A1 | 11/2005 | Wong et al. |
| 2005/0267935 A1 | 12/2005 | Gandhi et al. |
| 2006/0094371 A1 | 5/2006 | Nguyen |
| 2006/0098607 A1 | 5/2006 | Zeng et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0125601 A1 | 6/2006 | Onishi |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0199544 A1 | 9/2006 | Ramakrishna et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0258304 A1 | 11/2006 | Moon et al. |
| 2006/0291434 A1 | 12/2006 | Gu et al. |
| 2007/0010271 A1 | 1/2007 | Roy |
| 2007/0027622 A1 | 2/2007 | Cleron et al. |
| 2007/0049208 A1 | 3/2007 | Kim et al. |
| 2007/0053295 A1 | 3/2007 | Cleveland et al. |
| 2007/0066320 A1 | 3/2007 | Padovani et al. |
| 2007/0115180 A1 | 5/2007 | Kish et al. |
| 2007/0135167 A1 | 6/2007 | Liu |
| 2007/0153916 A1 | 7/2007 | Demircin et al. |
| 2007/0191068 A1 | 8/2007 | Ochi et al. |
| 2008/0013638 A1 | 1/2008 | Walton et al. |
| 2008/0070509 A1 | 3/2008 | Kish et al. |
| 2008/0080631 A1 | 4/2008 | Forenza et al. |
| 2008/0212582 A1 | 9/2008 | Zwart et al. |
| 2009/0046802 A1 | 2/2009 | Subramaniam |
| 2009/0080333 A1 | 3/2009 | Ozer et al. |
| 2009/0154359 A1 | 6/2009 | Strutt et al. |
| 2009/0285331 A1 | 11/2009 | Sugar et al. |
| 2009/0310590 A1 | 12/2009 | Kish et al. |
| 2010/0008343 A1 | 1/2010 | Kish et al. |
| 2010/0027496 A1 | 2/2010 | Higuchi et al. |
| 2010/0045480 A1 | 2/2010 | Vallapureddy et al. |
| 2010/0091749 A1 | 4/2010 | Kish et al. |
| 2010/0231473 A1 | 9/2010 | Shtrom et al. |
| 2011/0306293 A1 | 12/2011 | Miller |
| 2012/0039259 A1 | 2/2012 | Kish et al. |
| 2012/0094705 A1 | 4/2012 | Kish et al. |

FOREIGN PATENT DOCUMENTS

| | | |
|---|---|---|
| EP | 1 315 311 | 5/2003 |
| EP | 1 450 521 | 8/2004 |
| EP | 1 608 108 | 12/2005 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| WO | WO 02/25967 | 3/2002 |
| WO | WO 03/079484 | 9/2003 |

OTHER PUBLICATIONS

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.

Dell Inc., "How Much Broadcast and Multicast Traffic Should I Allow in My Network," PowerConnect Application Note #5, Nov. 2003.

Toskala, Antti, "Enhancement of Broadcast and Introduction of Multicast Capabilities in RAN," Nokia Networks, Palm Springs, California, Mar. 13-16, 2001.

Microsoft Corporation, "IEEE 802.11 Networks and Windows XP," Windows Hardware Developer Central, Dec. 4, 2001.

Festag, Andreas, "What is MOMBASA?" Telecommunication Networks Group (TKN), Technical University of Berlin, Mar. 7, 2002.

Hewlett Packard, "HP ProCurve Networking: Enterprise Wireless LAN Networking and Mobility Solutions," 2003.

Dutta, Ashutosh et al., "MarconiNet Supporting Streaming Media Over Localized Wireless Multicast," Proc. of the 2d Int'l Workshop on Mobile Commerce, 2002.

Dunkels, Adam et al., "Making TCP/IP Viable for Wireless Sensor Networks," Proc. of the 1st Euro. Workshop on Wireless Sensor Networks, Berlin, Jan. 2004.

Dunkels, Adam et al., "Connecting Wireless Sensornets with TCP/IP Networks," Proc. of the 2d Int'l Conf. on Wired Networks, Frankfurt, Feb. 2004.

Cisco Systems, "Cisco Aironet Access Point Software Configuration Guide: Configuring Filters and Quality of Service," Aug. 2003.

Hirayama, Koji et al., "Next-Generation Mobile-Access IP Network," Hitachi Review vol. 49, No. 4, 2000.

Pat Calhoun et al., "802.11r strengthens wireless voice," Technology Update, Network World, Aug. 22, 2005, http://www.networkworld.com/news/tech/2005/082208techupdate.html.

Areg Alimian et al., "Analysis of Roaming Techniques," doc.:IEEE 802.11-0410377r1, Submission, Mar. 2004.

Information Society Technologies Ultrawaves, "System Concept / Architecture Design and Communication Stack Requirement Document," Feb. 23, 2004.

Golmie, Nada, "Coexistence in Wireless Networks: Challenges and System-Level Solutions in the Unlicensed Bands," Cambridge University Press, 2006.

Mawa, Rakesh, "Power Control in 3G Systems," Hughes Systique Corporation, Jun. 28, 2006.

Wennstrom, Mattias et al., "Transmit Antenna Diversity in Ricean Fading MIMO Channels with Co-Channel Interference," 2001.

Steger, Christopher et al., "Performance of IEEE 802.11b Wireless LAN in an Emulated Mobile Channel," 2003.

Chang, Nicholas B. et al., "Optimal Channel Probing and Transmission Scheduling for Opportunistics Spectrum Access," Sep. 2007.

Tsunekawa, Kouichi "Diversity Antennas for Portable Telephones," 39th IEEE Vehicular Technology, May 1-3, 1989, San Francisco, CA.

PCT/US2005/026933, Search Report and Written Opinion mailed Feb. 22, 2006.

PCT/US2006/026418, Search Report and Written Opinion mailed Jan. 17, 2008.

U.S. Appl. No. 11/180,329, Office Action mailed Jun. 22, 2010.

U.S. Appl. No. 11/180,329, Office Action mailed Apr. 22, 2009.

U.S. Appl. No. 11/180,329, Office Action mailed Nov. 28, 2007.

U.S. Appl. No. 12/283,223, Final Office Action mailed Aug. 4, 2010.

(56) References Cited

OTHER PUBLICATIONS

U.S. Appl. No. 12/283,223, Office Action mailed Apr. 26, 2010.
U.S. Appl. No. 12/545,796, Office Action mailed Feb. 28, 2012.
U.S. Appl. No. 12/575,422, Final Office Action mailed Mar. 23, 2012.
U.S. Appl. No. 13/282,157, Final Office Action mailed Aug. 2, 2012.
U.S. Appl. No. 13/282,157, Office Action mailed Apr. 11, 2012.
U.S. Appl. No. 11/841,619, Office Action mailed Jul. 17, 2012.
U.S. Appl. No. 11/841,619, Final Office Action mailed Nov. 18, 2012.
U.S. Appl. No. 12/545,796, Final Office Action mailed Jan. 31, 2014.
Chu, S.H. et al., "Performance Enhancement by Using Switch-Beam Smart Antenna in 802.11a WLAN System," IEEE/ACES International Conference on Wireless Communications and Applied Computational Electromagnetics, pp. 1101-1105, Apr. 3-7, 2005.
Office Action mailed Aug. 2, 2013 (best available copy, no English translation provided).
U.S. Appl. No. 12/545,796, Office Action mailed Jun. 28, 2013.
U.S. Appl. No. 11/474,057, Office Action mailed Jul. 21, 2010.
U.S. Appl. No. 11/841,619, Office Action mailed Apr. 18, 2013.
U.S. Appl. No. 13/340,425, Office Action mailed Feb. 25, 2013.
U.S. Appl. No. 13/340,425, Office Action mailed Sep. 13, 2013.

* cited by examiner

COVERAGE ENHANCEMENT USING DYNAMIC ANTENNAS

CROSS-REFERENCE TO RELATED APPLICATION

This application claims the benefit of U.S. Provisional Application No. 60/702,730, filed Jul. 26, 2005 and entitled "Mechanism for Wireless LAN Coverage Enhancement Using Dynamic Antennas," the subject matter of which is hereby incorporated by reference. This application is related to and incorporates by reference co-pending U.S. application Ser. No. 11/041,145, filed Jan. 21, 2005 and entitled "System and Method for a Minimized Antenna Apparatus with Selectable Elements;" U.S. application Ser. No. 11/022,080, filed Dec. 23, 2004 and entitled "Circuit Board having a Peripheral Antenna Apparatus with Selectable Antenna Elements;" U.S. application Ser. No. 11/010,076, filed Dec. 9, 2004 and entitled "System and Method for an Omnidirectional Planar Antenna Apparatus with Selectable Elements;" U.S. application Ser. No. 11/180,329, filed Jul. 12, 2005 and entitled "System and Method for Transmission Parameter Control for an Antenna Apparatus with Selectable Elements;" and U.S. application Ser. No. 11/190,288, filed Jul. 26, 2005 and entitled "Wireless System Having Multiple Antennas and Multiple Radios."

BACKGROUND

1. Technical Field

The present invention relates to providing wireless local area network (LAN) coverage enhancement using dynamic antennas.

2. Description of Related Art

FIG. 1 illustrates a wireless local area network (LAN) 100 including an access point 110 with an omnidirectional antenna pattern 150 in the prior art. The access point 110 transmits to stations 120 and 130 on the omnidirectional antenna pattern 150. The access point 110 cannot transmit to a station 140 located outside of the omnidirectional antenna pattern 150 with a radius 160. The omnidirectional antenna pattern 150 of the access point 110 is typically effective for broadcast communication to reach each of the stations (e.g., the stations 120 and 130) within the coverage area of the omnidirectional antenna pattern 150 and associated with the access point 110. However, although the omnidirectional antenna pattern 150 reaches the broadest group of stations (e.g., stations 120 and 130), the omnidirectional antenna pattern 150 does not reach far enough (e.g., further than the radius 160) to cover the station 140.

In an 802.11 implementation of the wireless LAN 100, portions of the 802.11 protocol, such as beacon frames, use broadcast communication to communicate with the stations 120 and 130. A beacon frame (or beacon) enables the stations 120 and 130 to establish and maintain communication in an orderly fashion with each other and with the access point 110. The beacon also serves a variety of management functions, one being to identify the presence of the access point 110 in the wireless LAN 100.

The stations 120, 130, and 140 passively scan radio frequency (RF) channels and listen for beacons coming from access points (e.g., the access point 110) in order to find and associate with the access point 110. The beacon also enables a ranking of multiple access points (not shown) based on the received signal strength of beacons from the multiple access points, along with information regarding the capabilities and data rates of the multiple access points. The stations 120, 130, and 140 may then associate with the most preferable access point of the multiple access points to the stations 120, 130, and 140 based on the beacons received from the multiple access points. After association with the most preferable access point, the stations 120, 130, and 140 typically continue to scan for beacons, for example, transmitted from the multiple access points (not shown), in case the signal from the currently-associated access point becomes too weak to maintain communication. The stations 120, 130, and 140 also may roam throughout a building or facility, and use the beacons from the multiple access points to make roaming decisions to associate with one of the multiple access points.

Another purpose of the beacon is to support the stations 120, 130, and 140 operating in power saving mode. For example, the stations 120 and 130 synchronize communication with the access point 110 before the stations 120 and 130 operate in the power savings mode. With infrastructure networks, the access point 110 will buffer frames destined for the sleeping stations 120 and 130 and announce in the beacon which of the stations 120 and 130 have data frames buffered in the access point 110. When the stations 120 and 130 wake up from the power savings mode, the stations 120 and 130 retrieve the buffered frames from the access point 110.

Therefore, without beacons, communication within the wireless LAN 100 becomes difficult. For example, because the station 140 is located outside the omnidirectional antenna pattern 150, the station 140 does not receive beacons transmitted from the access point 110. The station 140 therefore cannot associate with the access point 110. The station 140 also cannot communicate with the stations 120 and 130 through the access point 110. The station 140 further cannot synchronize communication with the access point 110 in order to operate in power savings mode. Furthermore, the station 140 may disrupt communication between the access point 110 and the stations 120 and 130 through transmission that collide over the shared medium of the wireless LAN 100 with transmissions of the access point 110 and the stations 120 and 130.

SUMMARY OF THE INVENTION

The invention addresses the above problems by providing access points for enhanced coverage using dynamic antennas. A first access point for enhanced coverage of a wireless local area network (LAN) includes a processor and an antenna apparatus configured to provide a plurality of directional antenna patterns for communication over the wireless local area network. The processor determines a first of the plurality of directional antenna patterns and transmits a first broadcast communication over the wireless local area network on the first of the plurality of directional antenna patterns. The processor then determines a second of the plurality of directional antenna patterns and transmits a second broadcast communication over the wireless local area network on the second of the plurality of directional antenna patterns.

In some embodiments, the processor transmits the first broadcast communication or the second broadcast communication periodically at an interval of about 100 milliseconds according to an 802.11 implementation. The processor may transmit the second broadcast communication phased relative to transmission of the first broadcast communication. The processor may also determine the second of the plurality of directional antenna patterns by selecting a directional antenna pattern positioned substantially adjacent to the first of the plurality of directional antenna patterns. Advantageously, the antenna apparatus may transmit the first broadcast communication or the second broadcast communication a further distance from the access point as compared to transmitting the first broadcast communication or the second broadcast communication from the access point on an omnidirectional antenna pattern of the antenna apparatus.

In a second access point for enhanced coverage of a wireless local area network, the access point includes a processor and an antenna apparatus configured to provide a plurality of directional antenna patterns for communication over the wireless local area network. The processor maps a plurality of virtual access points, each virtual access point corresponding to at least one of the plurality of directional antenna patterns. The processor then transmits a broadcast communication on each of the virtual access points.

Advantageously, each virtual access point corresponds to at least one of the plurality of directional antenna patterns which provides the coverage area of the corresponding virtual access point. The processor may transmit the broadcast communication on a first of the plurality of virtual access points at a first interval phased relative to a second periodic interval for a second of the plurality of virtual access points. The antenna apparatus may transmit the broadcast communication a further distance from the access point on each of the plurality of virtual access points as compared to transmitting the broadcast communication from the access point on an omnidirectional antenna pattern of the antenna apparatus.

In still further embodiments, the processor transmits the broadcast communication periodically on each of the plurality of virtual access points to synchronize communication with a station operating in a power saving mode. The processor may transmit the broadcast communication periodically on each of the plurality of virtual access points to enable association of a roaming station with one of the plurality of virtual access points.

Advantageously, the first access point and the second access point provide coverage enhancement with the plurality of directional antenna patterns first by transmitting the broadcast communication farther from the access point as compared to transmitting the broadcast communication on an omnidirectional pattern of the access point. The access points provide enhanced coverage with directed coverage and/or virtual access points to communicate with distant stations while ensuring broadcast communication not otherwise capable with an omnidirectional pattern. The coverage enhancement provided by the access points allows distant stations to quickly make roaming decisions and synchronize communication with stations operating in power saving modes.

DETAILED DESCRIPTION OF THE INVENTION

An access point for enhanced coverage of a wireless local area network includes a processor and an antenna apparatus configured to provide a plurality of directional antenna patterns for communication over the wireless local area network. In some embodiments, the access point transmits beacons on each of the plurality of directional antenna patterns, for example, in a round-robin manner. Each of the directional antenna patterns extends further in length (although more concentrated in width) from the access point than an omnidirectional pattern of the antenna apparatus. Therefore, the access point transmits beacons further from the access point. Additionally, the sum coverage area of each of the directional antenna patterns, averaged over individual transmissions on each of the directional antenna patterns, is greater than the coverage area of the omnidirectional antenna pattern.

In some embodiments, the access point maps a plurality of virtual access points, each virtual access point corresponding to at least one of a plurality of directional antenna patterns provided by the antenna apparatus. The processor transmits a broadcast communication on each virtual access point. In other words, data sent from the physical access point on each of the directional antenna patterns appears to come from the virtual access point corresponding to the direction antenna pattern on which physical access point transmitted the data. Moreover, each virtual access point appears as a physical access point to a station within the corresponding directional antenna pattern mapped to the virtual access point. The virtual access points provide a coverage area in a desired direction that extends further from the access point (although more concentrated in width) than the radius of an omnidirectional antenna pattern of the access point. The sum coverage area of each of the virtual access points is greater than that of the omnidirectional antenna pattern of the access point.

The access point provides broadcast communication (e.g., a beacon) to stations a further distance from the access point that otherwise would not be capable of associating with the access point from broadcast communication transmitted on the omnidirectional antenna pattern of the access point. Additionally, transmitting the beacon on each virtual access point provides further connectivity and coverage in the wireless local area network. The access point, for example, maintains the station from disassociating with the access point because the beacon now reaches the distant station on one of the plurality of directional antenna patterns (or the virtual access points). The access point may also transmit the beacon to the station periodically to synchronize communication with distant stations operating in a power saving mode.

Figure 1:
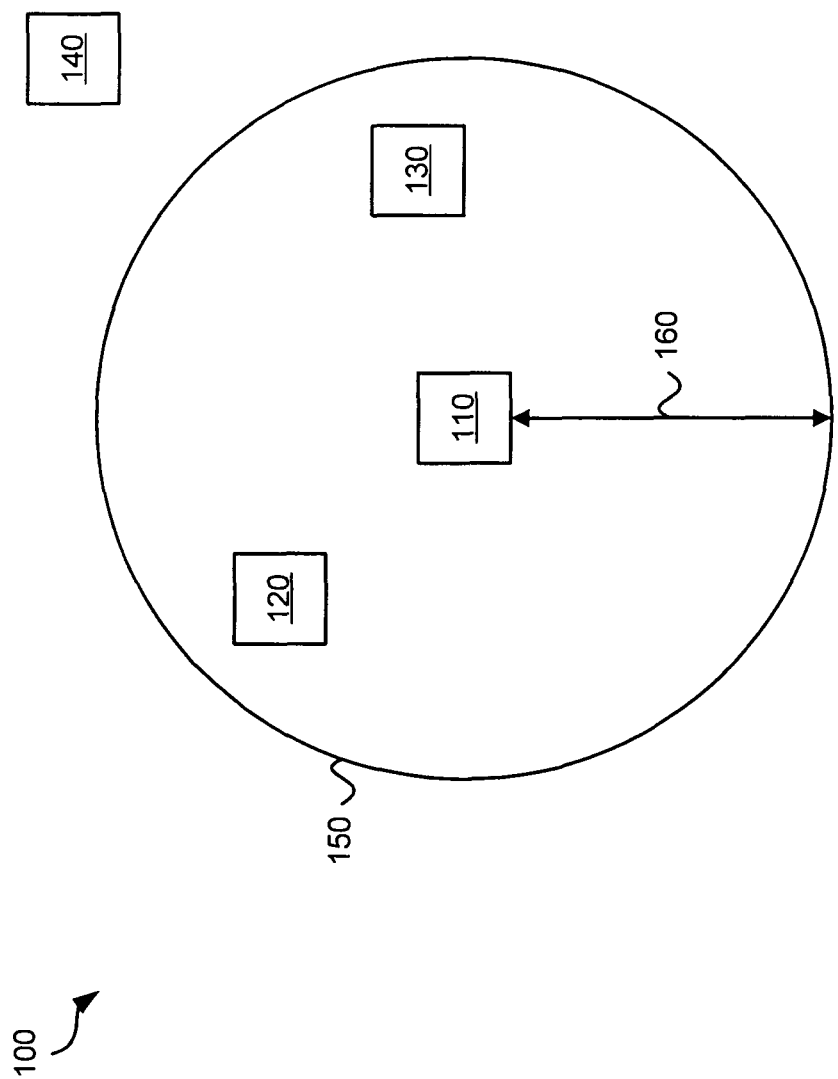
FIG. 1 illustrates a wireless local area network including an access point with an omnidirectional antenna pattern in the prior art.
Figure 2:
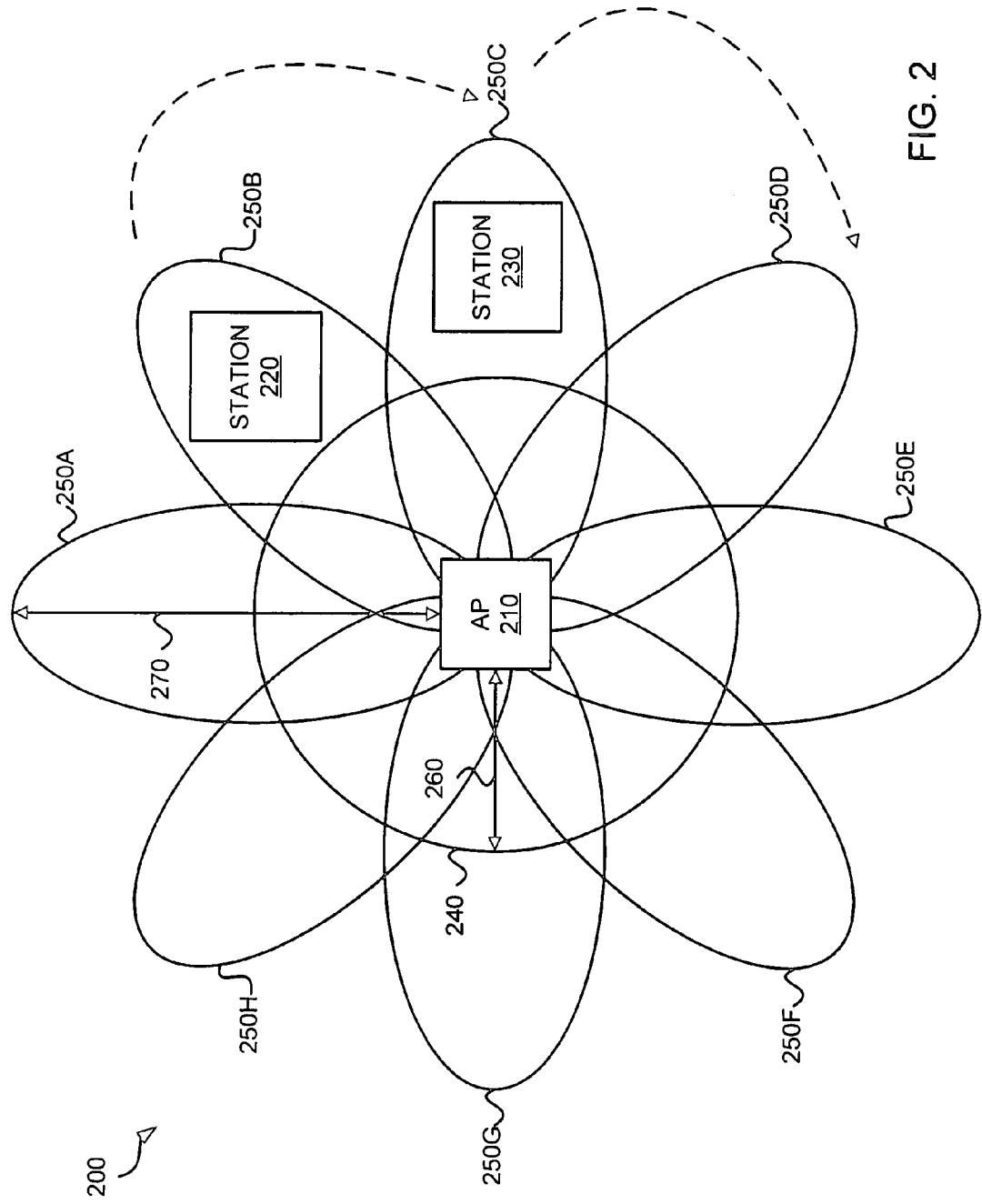
FIG. 2 illustrates a wireless local area network including an access point for enhanced coverage, in an exemplary implementation of the invention.

FIG. 2 illustrates a wireless local area network (LAN) 200 including an access point 210 for enhanced coverage, in an exemplary implementation of the invention. The wireless LAN 200 includes an access point 210 and stations 220 and 230. The access point 210 includes a processor (not shown) and an antenna apparatus (not shown) configured to provide an omnidirectional antenna pattern 240 with a radius 260 from the access point 210 and a plurality of directional antenna patterns 250A-H, each reaching a distance 270 from the access point 210. Each directional antenna pattern 250A-H extends the distance 270 further from the access point 210 than the radius 260 extends from the access point

210. The station 220 is covered on the directional antenna pattern 250B. The station 230 is covered on the directional antenna pattern 250C.

The access point 210 may comprise, for example without limitation, a transmitter and/or a receiver, such as an 802.11 access point, a set-top box, a laptop computer, a television, a PCMCIA card, a remote control, a Voice Over Internet telephone, or a remote terminal such as a handheld gaming device. Some embodiments of the antenna apparatus of the access point 210 are further described in co-pending U.S. application Ser. No. 11/041,145, filed Jan. 21, 2005 and entitled "System and Method for a Minimized Antenna Apparatus with Selectable Elements." The processor and mechanisms for selecting one or more of the directional antenna patterns of the access point 210 are further described in co-pending U.S. application Ser. No. 11/180,329, filed Jul. 12, 2005 and entitled "System and Method for Transmission Parameter Control for an Antenna Apparatus with Selectable Elements."

Broadcast communication comprises any networking message, packet, and/or frame addressed to one or more nodes of a communication network. Some examples of broadcast communication are a broadcast packet, a multicast packet, an 802.11 beacon, and/or a network management frame. Principles of the invention disclosed herein apply, without limitation, to other communication addressed to one or more nodes of a communication network. For the sake of simplicity, examples of periodic 802.11 beacon transmissions are described, but should not be considered limiting.

In operation, the access point 210 provides enhanced coverage when the access point 210 transmits 802.11 beacons on the directional antenna patterns 250A-H (e.g., to the stations 220 and 230) a further distance as compared to transmitting the beacons on the omnidirectional antenna pattern 240 of the access point 210. The access point 210 also provides enhanced coverage because the coverage area of the directional antenna patterns 250A-H, averaged over time, is greater as compared to the coverage area of the omnidirectional antenna pattern 240. The enhanced coverage provided by the access point 210 prevents the stations 220 and 230 from disassociating with the access point 210. Further, the enhanced coverage provided by the access point 210 allows the access point 210 to synchronize communication, even at the limits of the coverage area, with the stations 220 and 230 operating in power saving modes.

In a typical 802.11 wireless network, beacons are periodically transmitted every 100 milliseconds (ms). In the wireless LAN 200, if beacons are sent by the access point 210 at a periodic interval of 100 ms on N directional antenna patterns (where N=8 in FIG. 3), a station (e.g., the station 220) at the limits of the coverage of a directional antenna pattern (e.g., the directional antenna pattern 250B) receives 1/N of the total number of beacons transmitted. The periodic interval of the beacons seen by the station 220 appears to be N*100 ms, or 8*100 ms=800 ms, rather than the periodic interval of 100 ms used by the access point 210. If N is too large, the station 220 may disassociate with the access point 210 because the periodic interval of the beacons seen by the station 220 is too infrequent. In some embodiments, the periodic interval of the beacons seen by the station 220 can be reduced by increasing how often the beacons are sent on the N directional antenna patterns.

Figure 3:
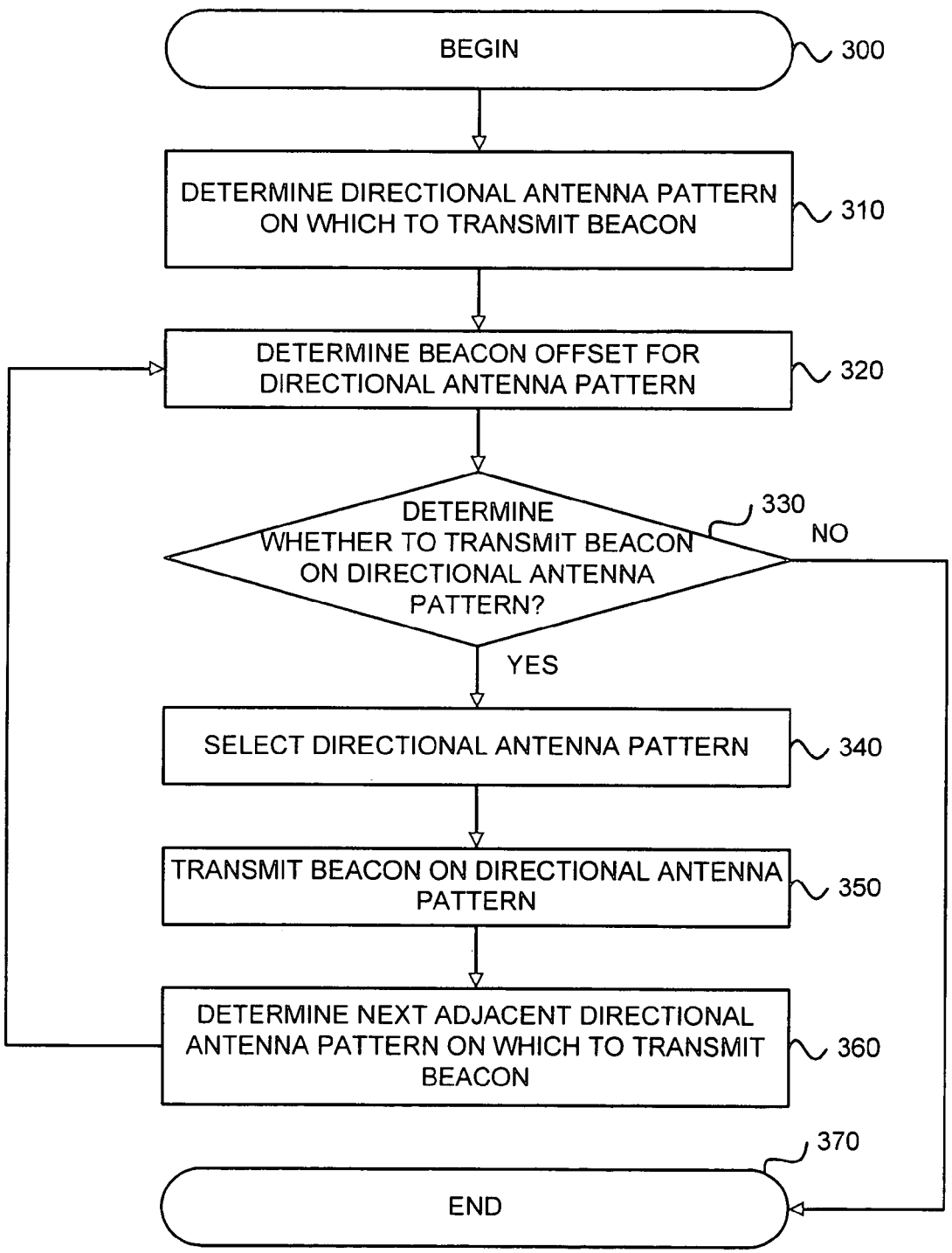
FIG. 3 illustrates a flowchart for a method of enhanced coverage, in an exemplary implementation of the invention.

FIG. 3 illustrates a flowchart for a method of enhanced coverage, in an exemplary implementation of the invention. The method begins in step 300. In step 310, the access point 210 determines a directional antenna pattern (e.g., the directional antenna pattern 250A) from the plurality of directional antenna patterns 250A-H. In step 320, the access point 210 determines a beacon offset for the directional antenna pattern 250A. The beacon offset allows the access point 210 to phase beacons transmitted on each of the directional antenna patterns 250A-H to avoid collisions and beacon jitter (or unexpected variations in beacons transmissions). For example, if the periodic interval is 100 ms, then the access point 210 may transmit the beacon on the directional antenna pattern 250A every 100 ms. The access point 210 then transmits the beacon on the directional antenna pattern 250B 12.5 ms later and so on (i.e., 110 ms/N, where N=8 for the directional antenna patterns 250A-H).

In step 330, the access point 210 determines whether to transmit the beacon on the directional antenna pattern 250A. Some examples why the access point 210 may not transmit are the access point 210 may not be able to communicate at that time because the wireless medium may be occupied, and no stations are present within the directional antenna pattern 250A. If the access point 210 does not transmit on the directional antenna pattern 250A, the method ends in step 370.

If the access point 210 determines to transmit on the directional antenna pattern 250A, the access point 210 selects the directional antenna pattern 250A in step 340. In step 350, the access point 210 transmits the beacon on the directional antenna pattern 250A. In step 360, the access point 210 determines a next adjacent directional antenna pattern (e.g., the directional antenna pattern 250B) on which to transmit the beacon. The access point 210 then determines whether to transmit on the directional antenna pattern 250B in step 320. In effect, the access point 210 transmits the beacon on each of the directional antenna patterns 250A-H in a round-robin manner by determining the next directional antenna pattern (e.g., the directional antenna pattern 250B) positioned substantially adjacent to the previous directional antenna pattern (the directional antenna pattern 250A).

The method provides enhanced coverage on each of the directional antenna patterns 250A-H. The access point 210 transmits the beacons a further distance on the directional antenna patterns 250A-H as compared to the omnidirectional antenna pattern 240. The access point 210 also provides enhanced coverage to the stations 220 and 230 as the directional antenna patterns 250A-H cover a larger coverage area, averaged over time, for broadcast communication as compared to the coverage area of the omnidirectional antenna pattern 240.

In one alternative to transmitting the beacons on the plurality of directional antenna patterns, virtual access points are used to provide a mechanism for enhanced coverage. Virtual access points generally provide differentiated or managed services in a communication network whereby a physical access point is configured to appear as one or more virtual access points. For example, in a physical access point of an 802.11 network, a first virtual access point provides open, unrestricted access to the Internet at a low band data rate (e.g., 56 Kilobits per second). A second virtual access point may provide broadband access (e.g., greater than 1 Megabits per second) to the Internet to authenticated users. A user's station (e.g., an 802.11 enabled laptop computer) may associate with the first virtual access point and then after authentication disassociate with the first access point and associate with the second access point for broadband access to the Internet. The differentiated services are provided by the physical access point, however, the physical access point appears as the first and second virtual access points.

Figure 4:
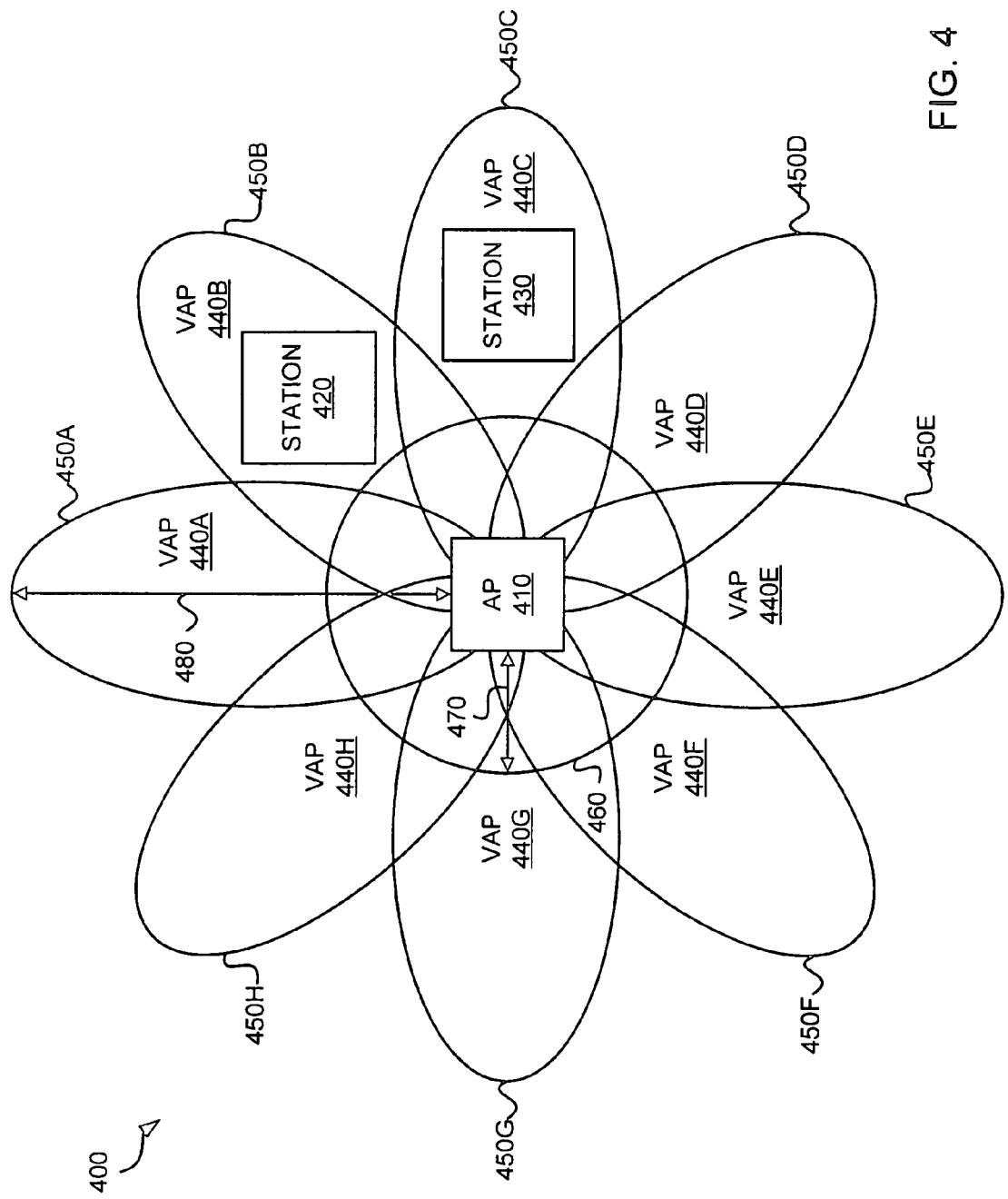
FIG. 4 illustrates a wireless local area network including an access point for enhanced coverage through virtual access points, in an exemplary implementation of the invention.

FIG. 4 illustrates a wireless local area network 400 including an access point 410 for enhanced coverage through virtual access points 440A-H, in an exemplary implementation of the invention. The wireless LAN 400 includes the access point 410, a station 420, and a station 430. The access point 410 is configured to provide a plurality of virtual access points 440A-H. In this example, each of the virtual access points 440A-H corresponds to one of the directional antenna patterns 450A-H. The station 420 is covered on the directional antenna pattern 450B. The station 430 is covered on the directional antenna pattern 450C.

The access point 410 comprises a processor (not shown) and an antenna apparatus (not shown) configured to provide an omnidirectional antenna pattern 460 with a radius 470 from the access point 410 and a plurality of directional antenna patterns 450A-H, each reaching a distance 480 from the access point 410. Each directional antenna patterns 450A-H extends the distance 480 further from the access point 410 than the radius 470 extends from the access point 410. One example of an antenna apparatus with individual selectable antenna element is described in co-pending U.S. application Ser. No. 11/041,145, Jan. 21, 2005 and entitled "System and Method for a Minimized Antenna Apparatus with Selectable Elements."

The access point 410 also includes hardware and/or software elements configured to map a virtual access point (e.g., virtual access point 440B) to at least one of the plurality of directional antenna pattern (e.g., the directional antenna pattern 450B). In one example, the antenna apparatus includes 8 individual selectable antenna elements. Each individual antenna element provides a distinct directional antenna pattern (e.g., the directional antenna patterns 250A-H). The processor maps a virtual access point (e.g., the virtual access point 440A) to at least one of the 8 individual antenna elements (e.g., the antenna element corresponding to the directional antenna pattern 450A).

The access point 410 transmits on each of the virtual access points 440A-H. In other words, when the access point 410 transmits on one of the directional antenna patterns 450A-H, for example, the directional antenna pattern 450B, the data appears to the station 420 to be sent from the virtual access point 440B mapped to the directional antenna pattern 450B. In this example, the coverage area of the directional antenna pattern 450B is the coverage area of the virtual access point 440B. In some embodiments, each of the virtual access points 440A-H advertises the same network identifier, e.g. service set identifier (SSID). The virtual access points 440A-H also may advertise different access point identifiers, e.g., basic service set identifiers (BSSIDs). The station 420, therefore, sees all of the beacons transmitted from the access point 410 on the directional antenna pattern 450B as being transmitted from a unique access point, the virtual access point 440B.

The sum of the coverage area for each of the virtual access points 440A-H provides the enhanced coverage for the access point 410. The access point 410 transmits on each of the virtual access points 440A-H a further distance (e.g., the distance 480) on corresponding directional antenna patterns (e.g., the directional antenna patterns 450A-H) as compared to transmitting on an omnidirectional antenna pattern 460 (e.g., the radius 470) of the access point 410. Furthermore, the access point 410 provides enhanced coverage for broadcast communication by transmitting 802.11 beacons on each of the virtual access points 440A-H corresponding to at least one of the directional antenna patterns 450A-H. The station 420, for example, can move to the limits of the coverage for the virtual access point 440B (e.g., the limits of the directional antenna pattern 450B) without disassociating from the virtual access point 440B due to infrequent beacon transmissions from the access point 410. However, the station 420 does not suffer from seeing 1/N beacons from the access point 410.

Since each of the directional antenna patterns 450A-H corresponds to one of the virtual access points 440A-H, beacons transmitted within a particular directional antenna pattern (e.g., the directional antenna pattern 450B) are seen to belong to the corresponding virtual access point (e.g., the virtual access point 440B) and not to the access point 410.

The stations 420 and 430 do not require any special configuration to roam between any of the virtual access points 440A-H or to operate in power savings mode. The virtual access points 440A-H also allow the stations 420 and 430 to associate with the "best" (e.g., best received signal strength or data rate) of the virtual access points 440A-H. In one example of operation, the virtual access point 440B appears to have the strongest received signal strength to the station 420 on the directional antenna pattern 450B. To the station 430 either the virtual access point 440C or the virtual access point 440D may provide the strongest received signal strength. The stations 420 and 430 may also move to the limits of coverage of the virtual access points 440A-H and still synchronize communication with the virtual access points 440A-H before and/or after the stations 420 and 430 operate in a power savings mode.

The access point 410 also prevents collisions and beacon jitter (e.g., unexpected variations in the periodic beacon interval) between beacons for the virtual access points 440A-H. In some embodiments, the access point 410 phases the periodic intervals for each of the virtual access points 440A-H relative to the periodic intervals of the other virtual access points 440A-H. Some examples of how the access point 410 phases the periodic intervals are shown in FIGS. 5A and 5B.

Figure 5A:
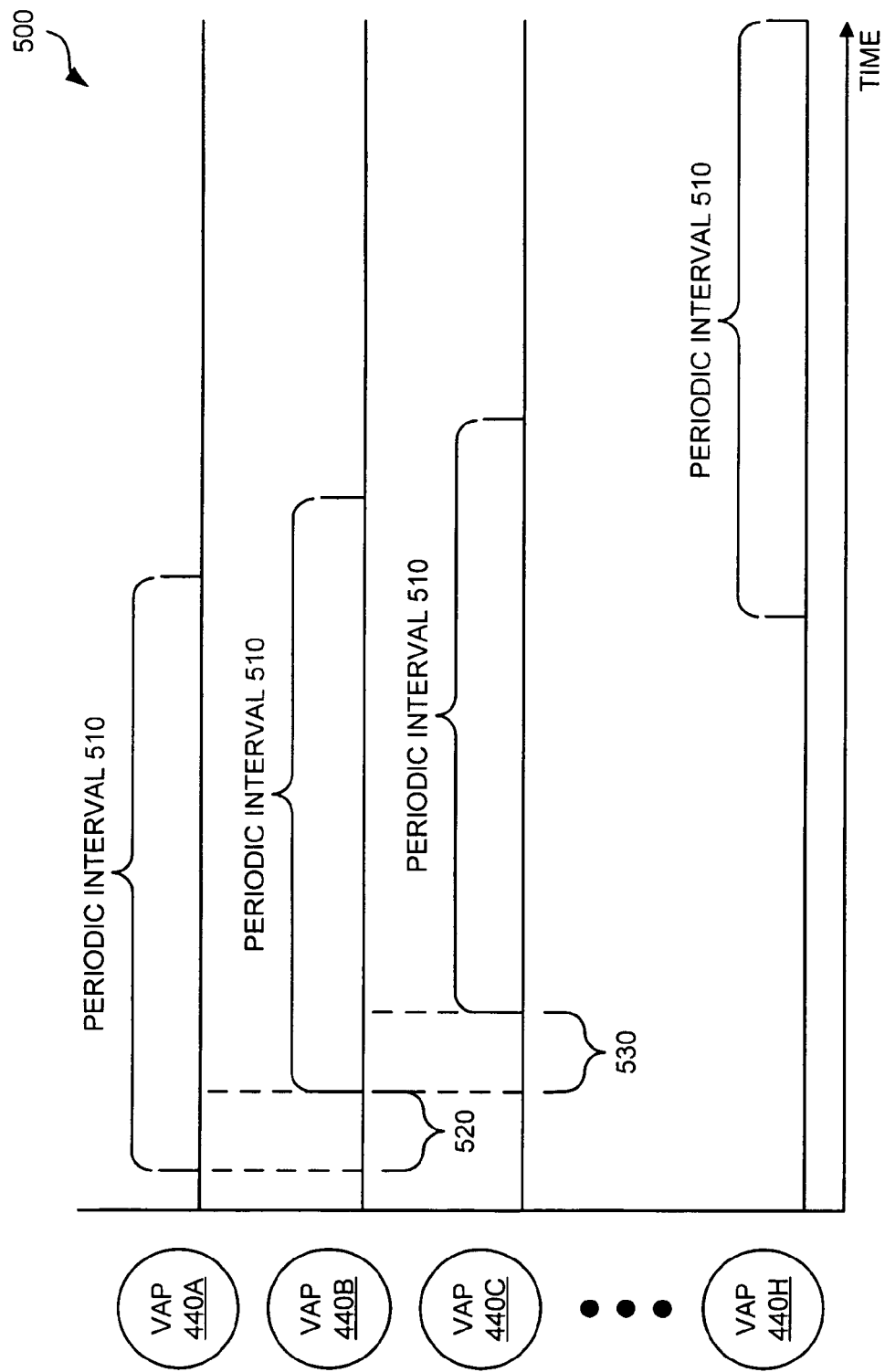
FIG. 5A illustrates a timing diagram for beacon transmission from the access point of FIG. 4, in an exemplary implementation of the invention.
Figure 5B:
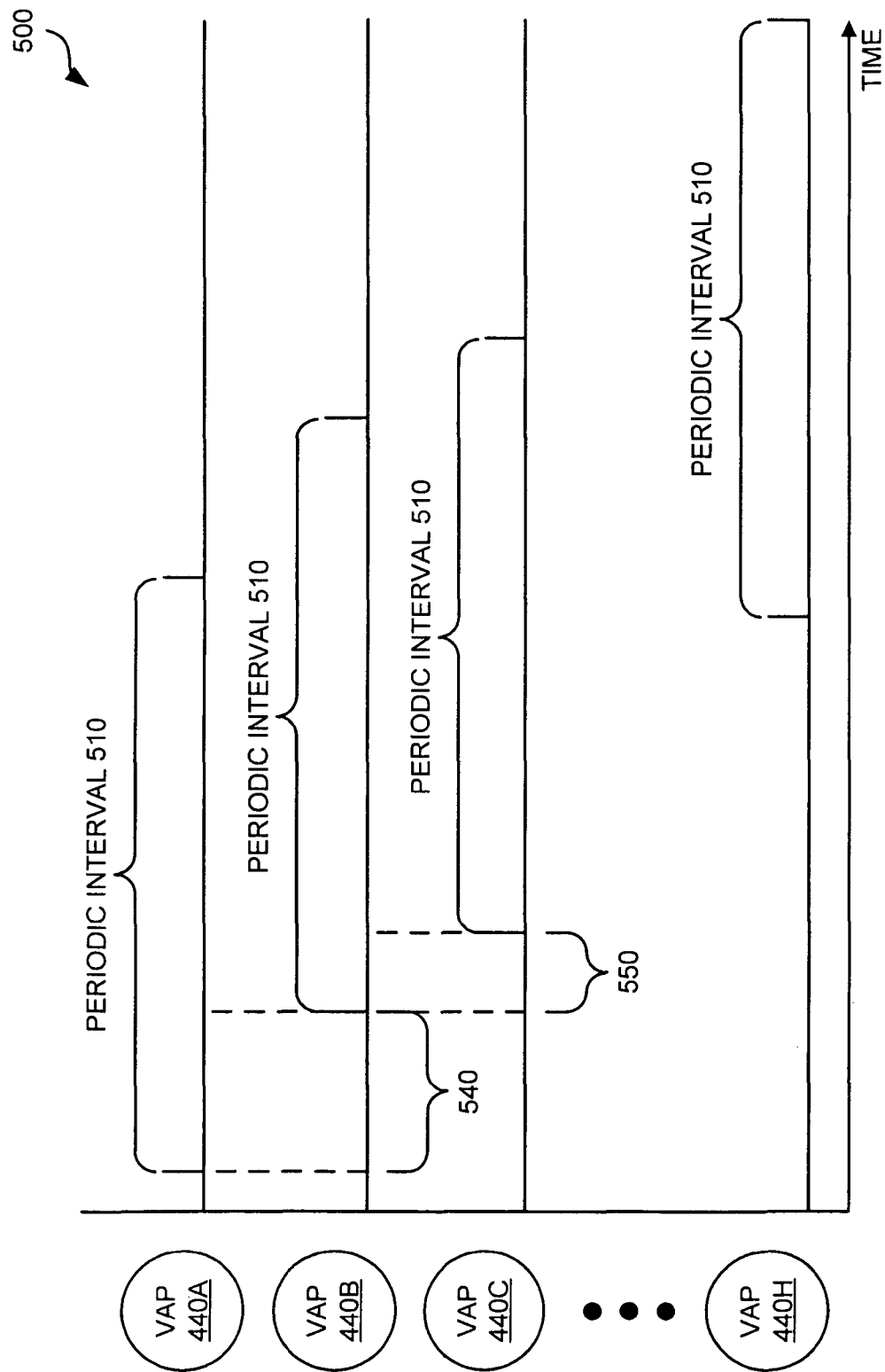
FIG. 5B illustrates a timing diagram for beacon transmission from the access point of FIG. 4, in another exemplary implementation of the invention.

FIG. 5A illustrates a timing diagram 500 for beacon transmission from the access point 410 of FIG. 4, in an exemplary implementation of the invention. The broadcast beacon timing diagram 500 illustrates periodic intervals 510 for when the access point 410 transmits a beacon on the virtual access points 440A-H. In one example, each of the periodic intervals 510 is 100 ms. Although shown as the same periodic interval for each of the virtual access points 440A-H, each of the virtual access points 440A-H may have a different periodic interval for broadcast communication.

The periodic intervals 510 for the virtual access points 440A-H are phased, for example, to prevent collision and beacon jitter. In this example, the start of the periodic interval 510 for the virtual access point 440B is offset (e.g., by offset 520) from the start of the periodic interval 510 of the virtual access point 440A. The start of the periodic interval 510 for the virtual access point 440C is offset (e.g., by offset 530) from the start of the periodic interval 510 of the virtual access point 440B.

FIG. B illustrates the timing diagram 500 for beacon transmission from the access point 410 of FIG. 4, in another exemplary implementation of the invention. In some embodiments, the phase of the periodic intervals 510 is dynamically adjusted to allow more time for one or more of the virtual access points 440A-H to service responses for a broadcast communication from stations (e.g., the stations 420 and 430). For example, since stations (e.g., the stations 420 and 430) associate with at least one of the virtual access points 440A-H (e.g., the virtual access point 440A), the access point 410 can determine the number of stations associated with the virtual access point 440A. The access point 410 then adjusts the start (e.g., offset 540) of the periodic interval 510 of the virtual access point 440B relative to the periodic interval 510 of the virtual access point 440A. The adjustment allows access point 410 to service responses sent from the stations to the virtual access point 440A in response to the beacon. The periodic interval 510 of the virtual access point 440C then may be phased (e.g., offset 550) relative to the periodic interval 510 of the virtual access point 440B such that the access point 410 transmits required beacons on the periodic interval 510.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be on the scope of the present invention. Hence, these descriptions and drawings should not be considered in a limiting sense, as it is understood that the present invention is in no way limited to only the embodiments illustrated.

The above-described functions can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An access point for enhanced coverage of a wireless local area network, the access point comprising:
   an antenna apparatus that provides a plurality of directional antenna patterns for communication over the wireless local area network; and
   a processor that executes software stored in memory, wherein execution of the software by the processor:
      determines a first of the plurality of directional antenna patterns,
      effectuates transmission of a first broadcast communication over the wireless local area network on the first of the plurality of directional antenna patterns in accordance with a communications protocol, the communications protocol having a periodic broadcast interval used to enable association of a station with the access point,
      determines a second of the plurality of directional antenna patterns, and
      effectuates transmission of a second broadcast communication over the wireless local area network on the second of the plurality of directional antenna patterns in accordance with the communications protocol, and the transmission of the second broadcast communication is offset from the transmission of the first broadcast communication by a time interval less than the periodic broadcast interval.

2. The system of claim 1 wherein the processor further executes software stored in memory to periodically effectuate the transmission of broadcast communications over the wireless network on the first or the second of the plurality of directional antenna patterns at an interval of the periodic broadcast interval.

3. The system of claim 1 wherein the processor further executes software stored in memory to effectuate the transmission of sequential broadcast communications on each of N directional antenna patterns in the plurality of directional antenna patterns in accordance with the communications protocol, where N is an integer greater than 1, and wherein the broadcast communications transmitted on a pair of the N directional antenna patterns are spaced apart by an interval equal to the periodic broadcast interval divided by N.

4. The system of claim 1 wherein determining the second of the plurality of directional antenna patterns includes selecting a directional antenna pattern positioned adjacent to the first of the plurality of directional antenna patterns.

5. The system of claim 1 wherein the processor further executes software stored in memory to effectuate transmission of sequential broadcast communications from each directional antenna pattern of the plurality of directional antenna patterns, wherein each sequential broadcast communication is provided by an adjacent directional antenna pattern with respect to the previous broadcast communication until a broadcast communication is made from each of the plurality of directional antenna patterns.

6. A method for enhanced coverage of a wireless local area network, the method comprising:
   determining a first of a plurality of directional antenna patterns provided by an antenna apparatus of an access point;
   transmitting a first broadcast communication over the wireless local area network on the first of the plurality of directional antenna patterns in accordance with a communications protocol, the communications protocol having a periodic broadcast interval that enables association of a station with the access point;
   determining a second of the plurality of directional antenna patterns provided by the antenna apparatus; and
   transmitting a second broadcast communication over the wireless local area network on the second of the plurality of directional antenna patterns in accordance with the communications protocol, and the transmission of the second broadcast communication is offset from the transmission of the first broadcast communication by a time interval less than the periodic broadcast interval.

7. The method of claim 6 wherein transmitting the first broadcast communication or transmitting the second broadcast communication comprises transmitting an 802.11 beacon.

8. The method of claim 6 further comprising transmitting sequential broadcast communications on each of N directional antenna patterns in the plurality of the directional antenna patterns in accordance with the communications protocol, where N is an integer greater than 1, and wherein the broadcast communications transmitted on a pair of the N directional antenna patterns are spaced apart by an interval equal to the periodic broadcast interval divided by N.

9. The method of claim 6 wherein determining the second of the plurality of directional antenna patterns comprises selecting a directional antenna pattern positioned adjacent to the first of the plurality of directional antenna patterns.

10. The method of claim 6 wherein transmitting the first broadcast communication or transmitting the second broadcast communication comprises transmitting periodically to synchronize communication with a station operating in a power saving mode.

11. The method of claim 6 wherein transmitting the first broadcast communication or transmitting the second broadcast communication comprises transmitting periodically to enable association of a roaming station.

12. The system of claim 1 wherein the communications protocol is in accordance with an 802.11 implementation.

13. The system of claim 1 wherein a sum of coverage areas of the plurality of directional antenna patterns is greater than a coverage area of an omnidirectional antenna pattern of the antenna apparatus.

* * * * *